Aug. 26, 1924.
H. W. ROGERS
1,506,445
SEGREGATED DRIVE FOR PAPER MACHINES AND THE LIKE
Original Filed Feb. 28, 1921
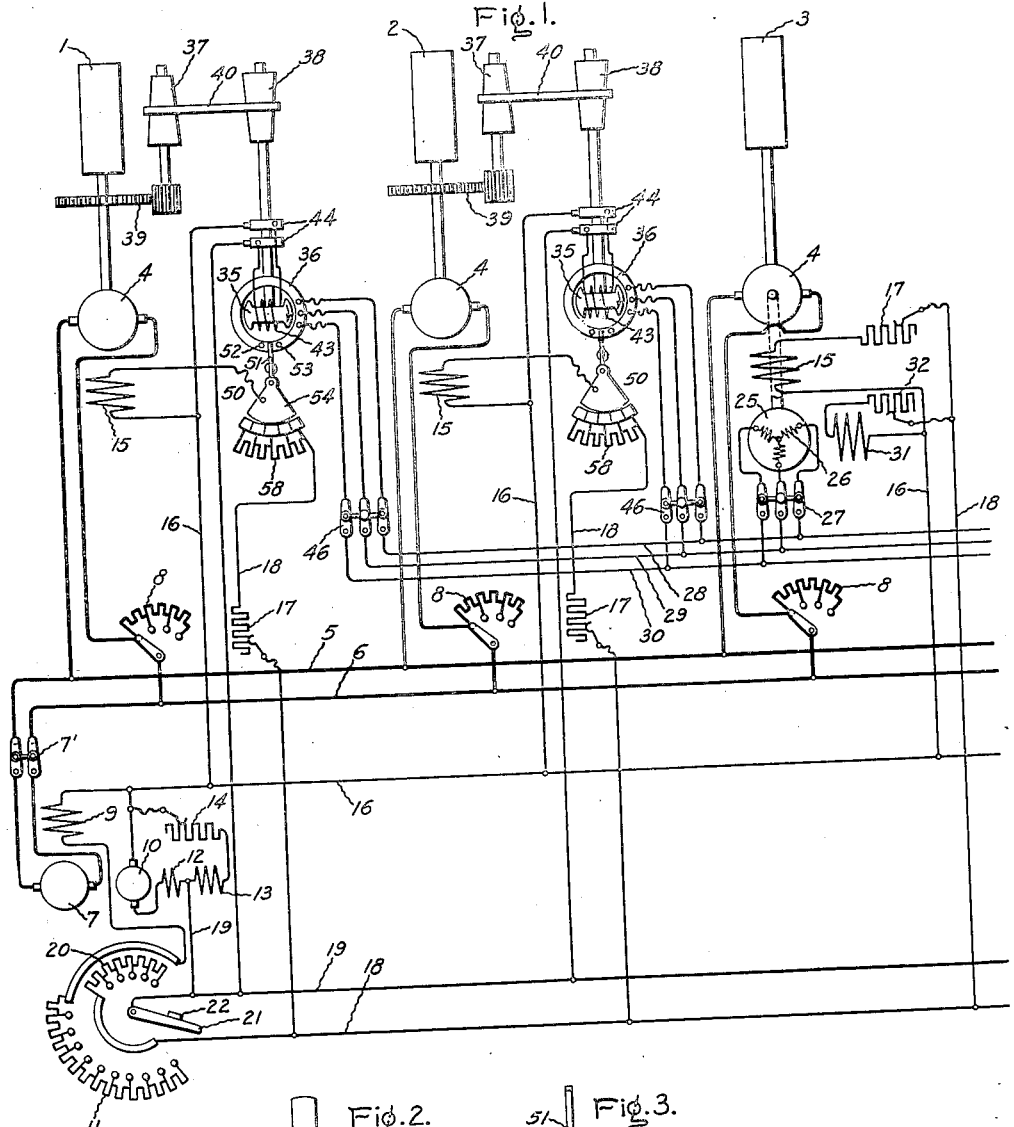
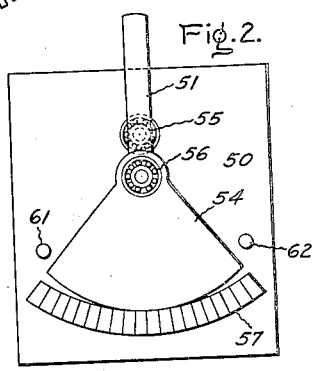
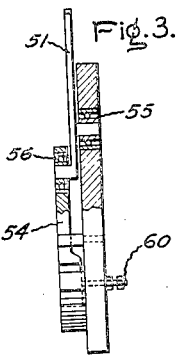
Inventor:
Harold W. Rogers,
by Albert G. Davis
His Attorney.

Patented Aug. 26, 1924.

1,506,445

UNITED STATES PATENT OFFICE.

HAROLD W. ROGERS, OF SCHENECTADY, NEW YORK, ASSIGNOR TO GENERAL ELECTRIC COMPANY, A CORPORATION OF NEW YORK.

SEGREGATED DRIVE FOR PAPER MACHINES AND THE LIKE.

Application filed February 28, 1921, Serial No. 448,553. Renewed April 19, 1924.

*To all whom it may concern:*

Be it known that I, HAROLD W. ROGERS, a citizen of the United States, residing at Schenectady, in the county of Schenectady, State of New York, have invented certain new and useful Improvements in Segregated Drives for Paper Machines and the like, of which the following is a specification.

My invention relates to segregated drives for paper machines and the like in which a plurality of driven elements are normally required to operate in fixed speed relation and in which it is essential that the speed of any individual element of the machine, as well as of the machine as a whole, be readily adjustable. In segregated drives for paper machines, or the like, it is absolutely necessary, for a successful operation of the machine, that each element of the machine be so arranged that the speed thereof may be varied to adjust the speed relation between the various elements and that after the speed of each element has been properly adjusted, the speed relationship of the various elements be maintained fixed regardless of changes in the load or other conditions which tend to disturb the speed at which the driving motor of any individual element tends to run.

My invention relates to the form of segregated drive shown and described in the co-pending application Serial No. 448,545, filed February 28, 1921, in the name of C. W. Shaifer, and assigned to the same assignee as this application, and the object of my invention is to provide certain improvements in this form of drive whereby the regulating apparatus may be reduced in amount, size and cost and whereby much closer and quicker regulation is obtained.

The said Shaifer application describes and broadly claims an improved electric drive employing a separate motor for driving each of a plurality of elements which are required to run in fixed speed relationship. Speed controlling means is provided for each of a plurality of said motors, and means is provided for controlling each of the said speed controlling means so as to maintain the speed relationship of the motors fixed. The means for controlling each of the motor speed controlling means each comprises a member driven by the corresponding motor and a cooperating independently rotating member, one of the members being arranged to provide magnetic poles of a fixed polarity and the other member being provided with a winding adapted to be connected to an alternating current source. A common source of alternating current is connected to the said alternating current windings so as to electrically tie in the control of the various motors and cause these motors to operate with a fixed speed relationship.

My invention will be better understood from the following description taken in connection with the accompanying drawing, and its scope will be pointed out in the appended claims.

In the accompanying drawing, Fig. 1 diagrammatically shows one embodiment of my invention; and Figs. 2 and 3 are views showing one form of frictionless rheostat which may be employed with my invention.

Referring to Fig. 1 of the drawing, 1, 2 and 3 represent elements of a machine to be regulated. Each element is driven by a motor 4 represented in this case as direct current motors connected to the mains 5 and 6 which are supplied from a generator 7 through a disconnecting switch 7'. A starting resistance 8 is provided for each motor. The generator 7 is provided with a field winding 9 supplied from an exciter 10 and an adjustable resistance 11 is provided in the circuit of the generator field winding 9 to adjust the voltage of the generator. The exciter 10 is provided with a cumulative series field winding 12 and a shunt field winding 13 in the circuit of which an adjustable resistance 14 is provided. The voltage impressed by the generator 7 upon the mains 5 and 6 will ordinarily be varied by adjusting the resistance 11 in the circuit of the field winding 9. This arrangement constitutes one form of the well-known Ward Leonard system for controlling the voltage supplied to various motors. Each motor 4 is provided with a field winding 15. One terminal of each field winding 15 is connected to the excitation main 16 which leads directly to one terminal of the exciter 10. The other terminal of each field winding 15 is connected through an adjustable resistance 17 to the excitation main 18 which leads to the other terminal of the exciter 10 through main 19 and the exciter series field winding 12. An adjustable resistance 20 is provided in the connection between the main 18 and the main 19 whereby the voltage of the excitation mains 16 and 18 may be varied to simultaneously adjust the strength of the various field windings 15 without varying the voltage across mains 16 and 19. I have shown a single arm 21 arranged to control both resistances 11 and 20, this arm being shown in off-position resting against the stop 22. In this position of the arm the circuit of the generator field winding 9 and the circuit supplying current to the motor field windings 15 are broken. As the arm 21 is rotated in a clockwise direction, it is arranged to complete the circuits of the generator and motor field windings and then remove the resistance 11 from the generator field winding 9 to bring the generator up to full voltage, after which more or less of the resistance 20 may be cut into the circuit to control the field strength and the speed of the motors 4. It is apparent, however, that my invention is not limited to any particular arrangement of circuits for supplying energy to the driving motors.

In order to maintain the various elements of the machine, in absolutely fixed speed relation, I provide, in the arrangement shown in the drawing, a small regulating dynamo-electric machine having both members movable for each element of the machine except one, which is arranged to drive a synchronous alternator. These regulating dynamo-electric machines must be of the synchronously running type, that is to say, they must tend to maintain a speed of rotation bearing a fixed relationship to the frequency of the alternating current supplied thereto.

As indicated, the element 3 is connected to a synchronous alternator 25 comprising an alternating current armature winding 26 which is adapted to be connected by means of the switch 27 to the alternating current mains 28, 29 and 30, and a field winding 31 which is connected through an adjustable resistance 32 to the excitation mains 16 and 18. While I have shown a polyphase alternator, it will be apparent that an alternator of any number of phases may be used. The elements 1 and 2 are each provided with a synchronous machine which comprises a rotor 35 and a stator 36. Each rotor 35 is represented as being driven by the corresponding driving motor 4 by means of the cone pulleys 37 and 38 and the gearing 39 whereby the speed of the rotor is greater than the speed of the corresponding motor. An adjustable belt 40 is arranged upon each pair of cone pulleys to provide for adjusting the speed of each individual element of the machine with respect to the speeds of the remaining elements. It will be apparent however that my invention is not limited to any particular form of speed adjusting means. The rotor 35 of each synchronous machine is represented as being provided with a direct current winding 43 which is arranged to provide the rotor with magnetic poles of a fixed polarity. Each winding 43 is adapted to be connected by means of the slip rings 44 to the excitation mains 16 and 19. The stator of each synchronous machine is provided with an alternating current winding which is arranged to be connected by means of a switch 46 to the alternating current mains 28, 29 and 30 which are supplied with alternating current of a frequency determined by the speed of the alternator 25 which is driven by the motor 4 driving the element 3.

The stator member 36 of each synchronous machine is mounted so as to be freely movable independently of the rotor member 35 in either direction around the rotor member and is constructed so as to be balanced in all positions so that it may remain in any position to which it may be moved. Each stator member in accordance with my invention is arranged to actuate a suitable regulating means for the driving motor of the corresponding machine element. In the arrangement shown this regulating means comprises a rheostat arranged to regulate the excitation of the driving motor and this rheostat is arranged to be direcly operated by the stator member. In accordance with my invention the stator member has no normal position to which it is biased in any way, and, therefore, the stator member and regulating rheostat will remain in any position to which it may have been moved in response to a load variation which requires an adjustment of the rheostat to compensate for the same. By this construction I am enabled to secure an exceedingly quick and sensitive regulation, since it is unnecesary to oppose the stator member rotation by means of springs or other biasing means which are necessary in an arrangement where the regulating machine is arranged as a contact-making dynamometer which controls a pilot motor for controlling the resistance in the driving motor field circuit. It will be apparent by this arrangement that the delayed operation incident to the use of a pilot motor regulating arrangement is avoided since any movement of the stator member is accompanied by an immediate change in the field strength of the corresponding driving motor. In order that the regulating apparatus may be as small and sensitive as possible, it is desirable that the friction of the rheostat be negligible. I have, therefore, devised a frictionless rheostat 50 shown in the drawing as comprising a pivoted arm 51, one end of which is adapted to be engaged by pins 52 and 53 carried by the stator 36. A sector 54 is pivotally mounted on the other end of the pivoted arm. The arm 51 and the sector 54 are mounted on ball bearings 55 and 56 respectively and so arranged that as the arm 51 is moved by the corresponding stator 36 the sector 54 rolls over the contacts 57 to which the sections of the resistance 58 are connected by any suitable means such as the terminals 60. Where the rheostat is arranged to be operated as shown and described, stops 61 and 62 are provided so as to limit the movement of the sector 54 of the rheostat.

While I have shown and described a particular construction of frictionless rheostat and a particular arrangement for transmitting motion from the stator member of the regulating machine to this rheostat, it will be apparent to those skilled in the art that my invention is not limited to any particular type of rheostat, nor any particular construction for transmitting motion from the movable stator member to said rheostat.

In order to simplify the description and operation of the embodiment of my invention shown in the drawing I will first describe the normal operation of the apparatus and then describe how the machine may be started from rest.

With any given frequency on the mains 28, 29 and 30 the speed and direction of rotation of the magnetic fields induced in the distributed windings on the stators 36 will be the same as the speed and direction of rotation of the rotors 35 which are driven from the various machine elements. By virtue of the well known properties of synchronous dynamo electric machines the magnetic poles of the rotor will tend to remain in a fixed space relationship with the magnetic poles of the stator. Since the windings on all of the stators 36 are supplied with current of the same frequency, the magnetic fields induced by the various stator windings will rotate with the same speed and according to my invention any tendency of any rotor to depart from this controlling speed causes the corresponding stator to actuate the corresponding rheostat 50 to correct for this tendency. If, for example, an increase in load occurs on any element of the machine so that the driving motor 4 therefor tends to slow down, the rotor 35 corresponding to this element of the machine tends to fall behind the magnetic field produced in the corresponding stator 36 thereby tending to cause a variation in the position of rotor 35 with reference to the stator 36. If the stator structure 36 were held rigidly in place the machine comprising this stator and rotor would tend to operate as a synchronous motor taking power from the mains 28, 29 and 30 and supplying a driving torque to assist the motor 4. According to my invention, however, the stators 36 are freely rotatable so that the stator 36 of the machine under consideration merely begins to move backwardly in an attempt to keep the magnetic poles in the stator in the fixed space relationship with the poles in the rotor. With the machine elements arranged for a direction of rotation corresponding to the arrows on the rotors 35 this backward movement of the stator 36 brings the pin 52 into engagement with the arm 51 of the rheostat 50 so that the rheostat is adjusted to cut sections of the resistance 58 into the circuit of the field winding 15 to maintain the speed of the motor at its normal speed of operation. As soon as sufficient resistance has been cut into the circuit of the field winding, the tendency of rotor 35 of the corresponding motor to fall behind the magnetic field produced in the corresponding stator 36 is checked and the backward movement of the stator stops the stator coming to rest in such a position that the amount of resistance 58 in the circuit of the field winding 15 is just sufficient to cause the motor to run at its normal speed of operation under the new load conditions. The tendency of any element to change its speed is thus checked in its very incipiency and no actual change in the speed thereof is permitted to take place. When one of the motors 4 tends to exceed its normal operating speed the corresponding rotor 35 drags its stator 36 around with it in the direction indicated by the arrow on the rotor, thereby causing the pin 53 to engage the arm 51 of the rheostat. The rheostat is thereby adjusted to cut sections of the resistance 58 out of the circuit of the corresponding field winding 15 to maintain the motor 4 at its normal speed of operation, thereby maintaining the fixed speed relationship of the elements of the machine.

In order to prevent hunting of the regulator a loose connection is provided between each stator and the corresponding arm 51. In the arrangement shown in the drawing, the pins 52 and 53 are spaced a little distance apart so that a small angular movement of the stator 36 may take place before the corresponding rheostat 50 is adjusted.

It will be observed that power required to be transmitted by the belt 40 is small since no more torque is ever developed than is necessary to actuate the frictionless rheostat 50. The cone pulleys 37 and 38 and the belt 40 will therefore be made small and light and the regulating machines may be of very small capacity.

By using a gearing 39 which causes the rotor 35 to turn at a considerably higher speed than the shaft of the corresponding driven element of the machine a very small angular departure of this shaft from its true angular position can be made to produce a greatly amplified effect on the rotor 35. By constructing the synchronous regulating machine as a multi-polar machine the sensitiveness of the regulation may be still further increased, since the regulating machine will then develop its full regulating torque with a smaller angular variation in mechanical degrees.

The machine shown in the drawing may be started from rest by starting the motors 4 either simultaneously or individually. If the motors are to be started simultaneously the exciter and generator armatures are first brought up to speed and the voltage of the exciter brought up to its normal value. Voltage will thus be applied to the excitation mains 16 and 19 so that the field windings 43 of the synchronous machine will be energized. The switch 7' will be opened and the field winding of the generator either deenergized entirely or reduced to a very small value depending upon the position of the arm 21 which controls the resistance 11. The starting resistance 8 will be cut out and the switches 27 and 46 will be opened. A switch 7' will then be closed and the voltage of the generator 7 gradually increased by increasing the strength of the generator field winding 9 by reducing the resistance 11. Since each motor 4 is connected across the mains 5 and 6 the gradual increase in voltage across these mains causes the motors to gradually increase in speed. Since the windings of the rotor 35 of the synchronous machines are supplied with current during this operation of bringing the motors up to speed the rotors 35 will induce eddy currents in the structure of the stators 36 to drag them around and actuate the rheostats 50 to cut out the resistance 58 thus giving the driving motors a strong starting torque. The motors may be started individually by first adjusting the voltage of the generator 7 to its normal value and then starting each motor by means of the corresponding starting resistance 8. When the motors have reached substantially the desired speed the switches 27 and 46 may be closed without exercising any care to synchronize the respective synchronous machines with the generator 25 since the torque required to move each stator is so small that the machines will readily get into step.

If, at any time, during the normal operation of the machine it is desired to increase the speed at which the whole machine is running, this result may be obtained by increasing the speed of the motor 4 driving the generator 25 by means of the adjustable resistance 17 so as to increase the frequency in the mains 28, 29 and 30. Any tendency of this frequency to increase will set the regulating devices associated with the other elements of the machine into operation to weaken the fields of the corresponding driving motors to speed up the rotors and keep them in step with the generator 25. The speed of the machine may, therefore, be readily adjusted. No great variations in speed will be attempted by varying the field strength of the motors in this manner, however, since it is preferable to secure such variations by adjusting the resistance 20 in the field circuits of the motors or by adjusting the voltage of the generator 7 which supplies power to the motors 4, by varying the resistance 11 in the circuit of the generator field winding 9.

It frequently happens that during the operation of a machine the fixed speed relationship of the elements has to be changed. To accomplish this result between any two sections, it is merely necessary to adjust the position of the corresponding belt 40 along the cone pulleys 37 and 38. It will be apparent that the adjustment of the belt will make a different speed of the machine element correspond to the same speed of the rotor driven by that element.

While I have illustrated and described a dynamo-electric machine of the synchronous type, in which one of the members is excited to produce fixed magnetic poles, it will be apparent to those skilled in the art that other types of synchronously running machines may be used if desired. It will also be apparent to those skilled in the art that my invention is not limited to an arrangement in which the synchronous alternator is driven by one element of the machine to be controlled, since a synchronously running machine may be provided for each element of the machine and the synchronous alternator driven by any suitable adjustable speed constant speed prime mover, and where the machine is operated under conditions that might at times disable any of the driven elements thereof the latter arrangement will be preferable.

While I have shown and described one embodiment of my invention, it is obvious that many variations and modifications may be made within the spirit and scope of my invention and I aim to cover all such variations and modifications in the appended claims.

What I claim as new and desire to secure by Letters Patent of the United States, is:—

1. In an electric drive wherein a plurality of elements are required to run in fixed speed relationship and wherein a motor is arranged to drive each of a plurality of said elements, the combination of means for controlling the speed of each of a plurality of said motors, and means for actuating each of said speed controlling means to maintain the speed relationship of the motors fixed consisting of a member driven by the corresponding motor and a cooperating freely movable member, one of said members being arranged to provide magnetic poles of a fixed polarity and the other member being provided with a winding adapted to be connected to an alternating current source, and a common source of alternating current for supplying each of said windings.

2. In an electric drive wherein a plurality of elements are required to run in fixed speed relationship and wherein a motor is arranged to drive each of a plurality of said elements, the combination of means for controlling the speed of each of a plurality of said motors, and means for actuating each of said speed controlling means to maintain the speed relationship of the motors fixed comprising a dynamo-electric machine of the synchronously running type having one member driven by the corresponding motor and the other member mounted so as to be freely movable, a winding on one of said members arranged to be connected to a source of alternating current and a common source of alternating current for supplying said alternating current windings.

3. In an electric drive wherein a plurality of elements are required to run in fixed but adjustable speed relationship and wherein a motor is arranged to drive each of a plurality of said elements and wherein means are provided for controlling the speed of each of a plurality of said motors comprising a dynamo-electric machine of the synchronously running type having one member thereof driven through an adjustable speed connection from the corresponding motor and wherein the other member is provided with a winding adapted to be connected to a source of alternating current and wherein a common source of alternating current is provided for supplying each of said alternating current windings, characterized by the fact that the member of said dynamo-electric machine which is not driven is arranged to be freely movable about the driven member and substantially balanced in all positions to which it may be moved and by the fact that said freely movable member is arranged to operate directly the speed regulating means for the corresponding driving motor.

4. In an electric drive wherein a plurality of elements are required to run in fixed speed relationship and wherein a motor having a field winding is arranged to drive each of a plurality of said elements, the combination of means for controlling the speed of each of a plurality of said motors comprising an adjustable resistance in the circuit of the field winding of the motor, means for adjusting said resistance comprising a member driven by the corresponding driving motor and a cooperating freely movable member balanced in all positions and arranged to adjust said resistance, one of said members being arranged to provide magnetic poles of a fixed polarity and the other member being provided with a winding adapted to be connected to an alternating current source, and a common source of alternating current for supplying said alternating current windings.

5. In an electric drive wherein a plurality of elements are required to run in fixed speed relationship and wherein a motor having a field winding is arranged to drive each of a plurality of said elements, the combination of means for controlling the speed of each of a plurality of said motors comprising a substantially frictionless rheostat connected in the circuit of the field winding of the motor, means for adjusting said rheostat comprising a member driven by the corresponding driving motor, and a cooperating freely movable member balanced in all positions, one of said members being arranged to provide magnetic poles of a fixed polarity and the other member being provided with a winding adapted to be connected to an alternating current source, and a loose mechanical connection between said freely rotatable member and said rheostat whereby said rheostat is adjusted and hunting is avoided, and a common source of alternating current for supplying said alternating current windings.

In witness whereof, I have hereunto set my hand this 26th day of February, 1921.

HAROLD W. ROGERS.